July 9, 1968

L. E. SCHEEL ET AL 3,391,779

VERTICAL AUGER WITH TILTING HOPPER

Filed May 19, 1966

INVENTORS
LAWRENCE E. SCHEEL
RICHARD E. DOERFER

BY Brown, Jackson, Boettcher & Dienner

ATTORNEYS

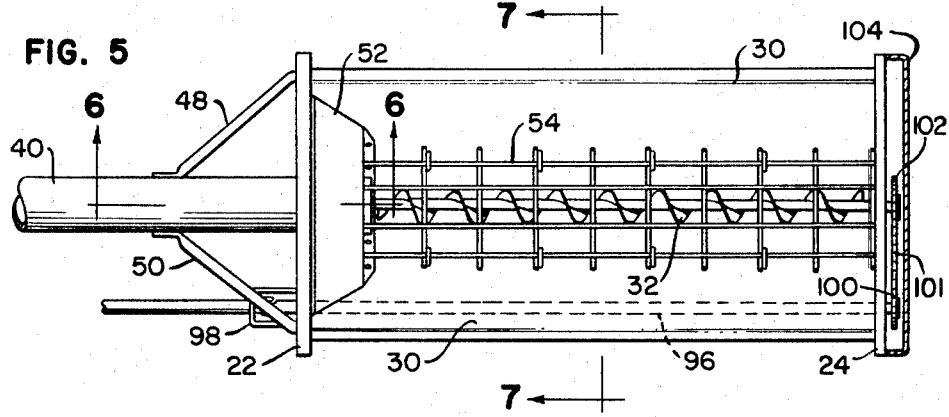
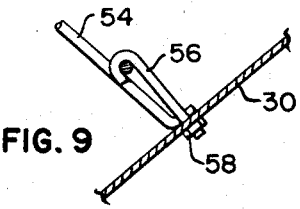
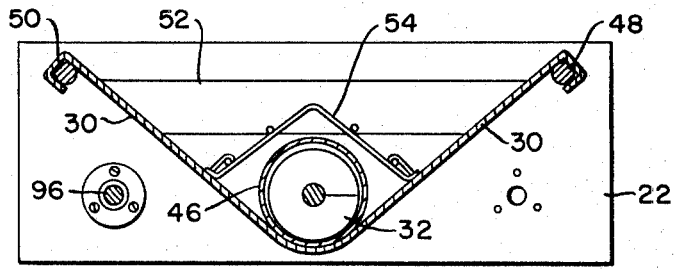
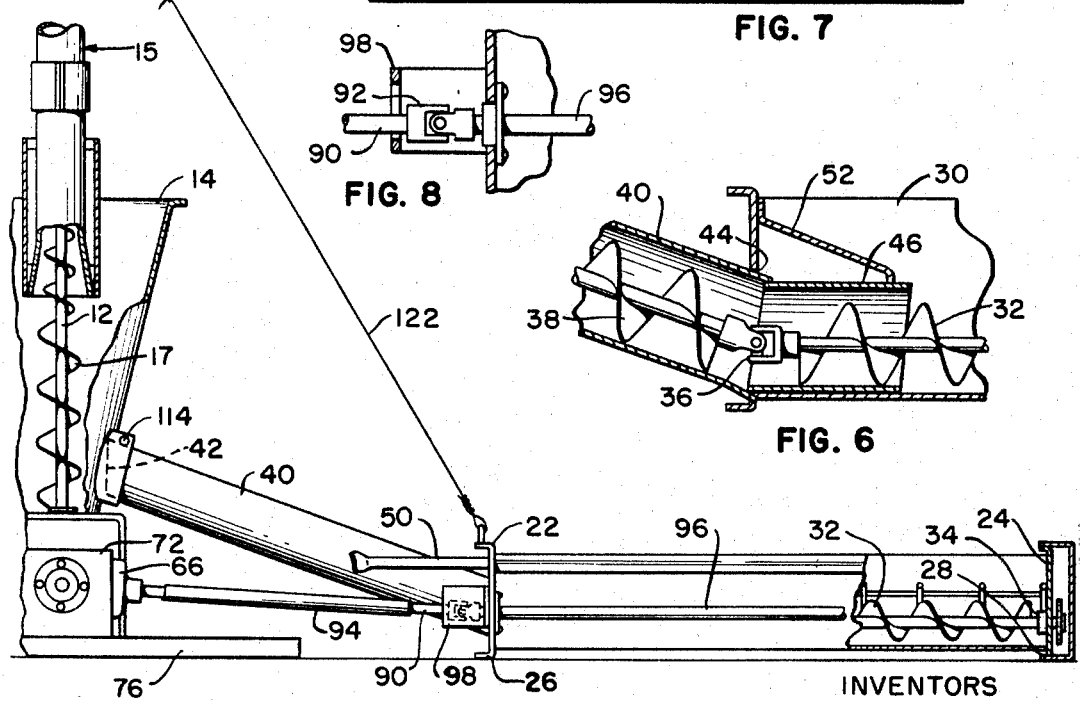

3,391,779
VERTICAL AUGER WITH TILTING HOPPER
Lawrence Eugene Scheel and Richard E. Doerfer, Waterloo, Iowa, assignors to Kewanee Machinery & Conveyor Company, Kewanee, Ill., a corporation of Illinois
Filed May 19, 1966, Ser. No. 551,442
8 Claims. (Cl. 198—87)

ABSTRACT OF THE DISCLOSURE

A vertical lift conveyor for top loading a silo and the like provided with a tiltable hopper which may be set on the ground to provide a low stable target into which grain may be dumped as from a dump truck or other farm wagon. The hopper having a feed auger section extending along the bottom wall thereof with one end entering into a short transition tube where it also communicates with and is connected to an inclined delivery auger section leading to an entrance into the vertical lift conveyor, the transition tube enforcing feed from the hopper auger section into the inclined delivery auger section and its enclosing tube, the lower end of the delivery tube being fixed to the hopper and its upper end being piovtally mounted to the vertical lift conveyor, the drive for the hopper auger section being pivotally mounted to the drive for the vertical lift conveyor such that the axes of the two pivotal mounts are parallel, and the hopper and associated elements being otherwise adapted to be tilted during operation thereof without interruption of said operation and also for storage in an upright position against the vertical lift conveyor.

---

This invention relates to vertical lift conveyors of the screw auger type which are particularly useful in the elevating of free flowing bulk materials as, for example to load silos, bins and other storage buildings with corn and cob meal, shelled and/or cracked corn, soy beans, as well as a variety of other small grains or similar granular material.

In the copending application of Richard R. Neebel and Richard E. Doerfer, Ser. No. 475,755, filed July 29, 1965, now U.S. Letters Patent 3,318,438, issued May 9, 1967, one such vertical lift conveyor is disclosed comprising a tube enclosed auger rotatably supported within a conically shaped loading member so as to turn about the vertical axis thereof. The tube enclosure terminates short of the lower end of the auger so that the lower flightings of the vertical auger are exposed for loading with material poured into the annular shaped open top of the conical loading member about the tube and the remaining upper flightings of the auger enclosed by the tube constitute the conveying section thereof which raise the material to the top of the conveyor. As there disclosed, the diameter of the tube enclosed conveyor flightings are less than the diameter of lower or loading flightings. However, therebetween is provided an intermediate flighting section of a diminishing diameter which merges the diameter of the lower load flightings into the smaller diametered conveyor flightings. A slip tube is adjustably mounted over the lower end of the tube to variably enclose the intermediate flightings since it was found that by observing particular ratios of cone diameter to load and conveyor flightings diameters, one is able to effect a supercharging of the vertical lift conveyor with a minimum loss of efficiency through spillage or back slip. However, the conical shape of the loading member because of its encircling relation to the auger and the need to observe a diametrical relation thereto is difficult to directly load from rear dump wagons, trucks and the like.

It is therefore a principal object of the present invention to provide a vertical lift conveyor such as described with a lateral loading hopper into which material may be directly dumped from rear dump wagons or trucks and directly conveyed to the base of the vertical auger for elevation thereby to the top of the silo, storage bin or other building being filled.

Thus, the present invention contemplates a top loading hopper which preferably will have a rectangular open top sufficiently large and at the same time low slung that conventional size truck and wagon loads may be conveniently poured into it. For this purpose, it usefully will have opposed downwardly sloped converging sidewalls between which is provided an exposed auger section leading into an inclined conveyor tube communicating with an entrance into the conical hopper of the vertical conveyor adjacent the base of its vertical auger.

A feature of the invention is that the inclined conveyor tube of the hopper also includes a auger section. However, only the remote end of the exposed auger section within the hopper proper is mounted to the hopper, the auger section within the tube being pivotally connected thereto but only at its lower end so as to rotate with rotation of the end mounted loading auger section. This has been found sufficient to obtain the required movement of material from the hopper into the conical member of the vertical lift conveyor. At the same time it permits the upper or remote end of the inclined conveyor tube to be releaseably pivoted to the wall of the conical loading member of the vertical conveyor immediately above the entrance thereto which accommodates raising the hopper to different heights and/or loading angles. It also permits pivoting the hopper to a vertical storage position alongside the vertical conveyor without having to disconnect parts.

A further feature of the invention is the provision of a mount or collar about the entrance to the base of the vertical conveyor with which the inclined conveyor tube of the loading hopper communicates, which minimizes spillage of material at this junction at different angular working positions of the loading hopper.

A further feature is the location of the pivotal connection of said inclined conveyor tube on the collar in front of and above the entrance to the vertical conveyor housing which not only facilitates the aforementioned pivoting of the hopper to different angular working positions but also exposes the entrance to the vertical lift conveyor housing when the hopper is tilted to its vertical position adjacent the vertical conveyor so that it serves as a clean-out and discharge for foreign materials such as ice and snow.

Another feature of the invention is the housing of the free end of the exposed horizontal or loading auger section in a transition tubular section of short length which confines the feed of the material past the universal connection of the two sections of the auger to maximize feeding capacity and also acts as a bearing for the otherwise unmounted end of the exposed auger section to minimize play.

Another feature of the invention is the novel construction of drive means employed which perimts simutlaneous rotation of both the vertical auger and the hopper auger sections about their respective longitudinal axes by the same prime mover while also permitting tilting of the hopper about its pivotal connection to accommodate different angular operating positions relative to the vertical conveyor without interrupting feed of material from the hopper into the vertical lift conveyor.

Still another feature of the invention is the provision of counter balancing means which may be mounted on the vertical auger tube to provide adjustable weight transfer for easy raising and lowering of the hopper to different angular loading positions and to its more nearly vertical storage position alongside the vertical lift conveyor.

Still other features of the invention include the provision of the loading hopper with converging sidewalls on either side of the length of the exposed auger section which facilitate the loading thereof and the enclosure of the said exposed auger section by a readily removable large open type mesh cover which provides a safety feature without detracting from the function of said sidewalls.

Still another feature of the inventions is the provision by which the power take off or electric motor drive may be located to either the right or left side of the vertical conveyor when viewing the auger end by assembly of components of a standard unit.

Still another and more specific object of the present invention is to provide a lateral tilting screw auger hopper for a vertical lift conveyor which can be operated inexpensively and is also at the same time efficient in its operation.

A further object of the present invention is to provide such a tilting hopper which is also simple in construction and may be readily mass produced at low cost..

A further object of the present invention is to provide such a hopper which is lightweight and easily maneuverable and the same time is rigid and rugged in its construction.

Other and further objects, features and advantages of the invention will be apparent from the following description of a presently preferred embodiment thereof, given for the purposes of disclosure, and taken in conjunction with the accompanying drawings in which like character references designate like parts relative to the several views and where:

FIGURE 2 illustrates the more nearly horizontal or loading position of the loading hopper;

FIGURE 5 is a top plan view of the loading hopper;

FIGURE 6 is a vertical sectional view taken along lines 6—6 of FIGURE 5, and illustrates the assembly of the inclined conveyor section with the hopper proper and the connection of their respective auger sections;

FIGURE 7 is a sectional view taken along lines 7—7 of FIGURE 5 looking in the direction indicated by the arrows and shows further details of the construction of the loading hopper;

FIGURE 8 is an enlarged fragmented view illustrating the universal connection between two of the parts of the drive shaft which link the hopper auger section to the pivotally mounted gear drive mechanism for rotation thereby;

FIGURE 9 is an enlarged view illustrating the hanger means employed to releasably attach the mesh screen to the inclined sidewalls of the hopper.

Figure 1:
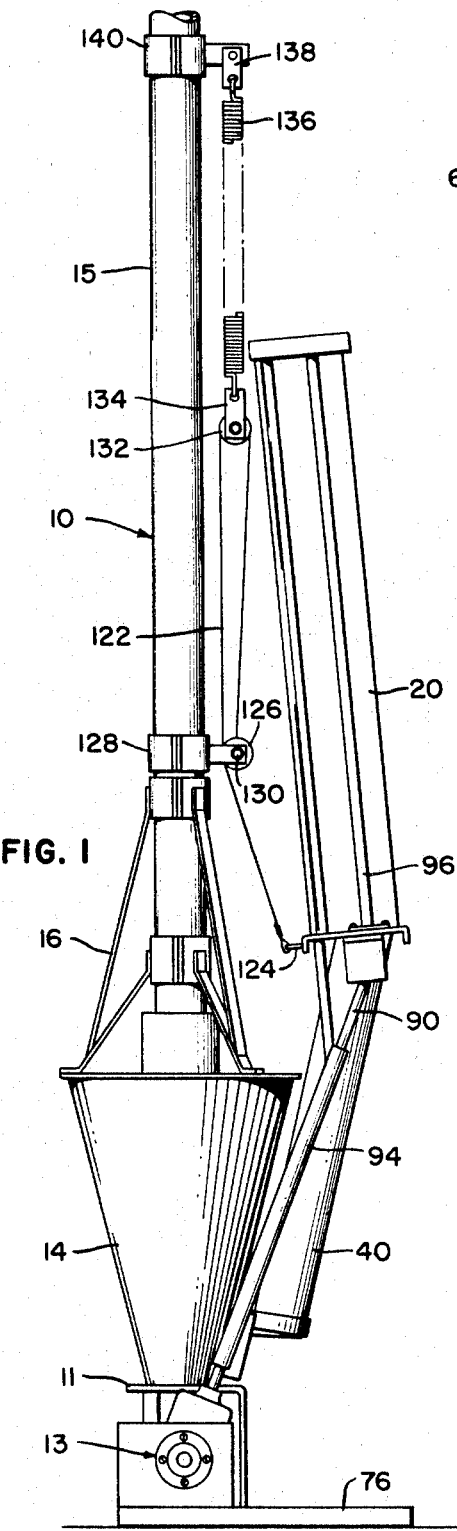
FIGURE 1 illustrates a vertical lift conveyor having a pivotally connected lateral loading hopper constructed in accordance with the present invention and shown in its generally vertical storage position alongside the vertical conveyor.

Referring now more specifically to the several views, and first to FIGURES 1 and 2, a vertical lift conveyor of the auger screw type as disclosed and claimed in the mentioned Neebel and Doerfer application, Ser. No. 475,755, is indicated generally at 10. As shown by said figures vertical lift conveyor 10 is mounted on a base 11 and comprises an enclosure for a vertical screw auger 12 rotatably supported therein at its top (not shown) and bottom ends by conventional bearings so as to be rotatable about its vertically disposed longitudinal axis by means 13 contained within base 11 as hereinafter more particularly described. Said conveyor housing or enclosure 10 comprises a conically shaped loading member 14, and a vertical conveyor tube 15 centered within said conical member 14 and appropriately spaced braces 16, which support the conveyor tube on the conical loading member 14 with its lower end disposed below the top thereof but off the base or bottom wall thereof a predetermined distance which is sufficient to expose a limited number of the lower flights of the screw auger constituting the flights 17 thereof. Conventionally, and as disclosed in said Neebel and Doerfer application, vertical lift conveyor 10 is loaded through the annular open top of its conical member 14 which encircles tube 15. Screw auger 12 is continuously rotated by means 13 so as to effectively lift and thereby convey material loaded into its intake flights 17 upwardly through the conveyor housing 15 for discharge through a top spout (not shown) which is directed through the roof of the silo or other bin with which the vertical lift conveyor is utilized. Conventionally, the vertical lift conveyor is secured to the sidewall of such silo or other structure by suitable hangers (not shown). It is believed that the above description of a vertical lift conveyor with which the present invention is concerned is sufficient for a full and complete understanding thereof. However, a further and more detailed description thereof may be had by reference to the said copending application of Richard R. Neebel and Richard E. Doerfer, Ser. No. 475,755, the disclosure of which is intended to be herein included by the aforementioned reference thereto. At the same time, however, it will also be understood that the invention in loading hopper as hereinafter described is also useful with other vertical lift conveyors.

Figure 3:
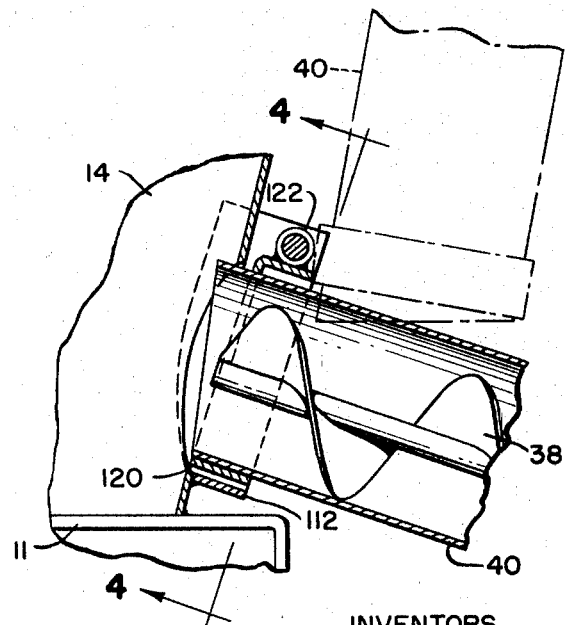
FIGURE 3 is an enlarged sectional view of the delivery end of the inclined tube of the loading hopper and illustrates the manner employed to mount said end to the vertical conveyor enclosure.

Referring now to FIGURE 2, and considering FIGURES 5, 6 and 7 in conjunction therewith, the present invention contemplates an auxiliary loading device which may comprise an accessory adapted for assembly with the above described vertical lift conveyor. It may also be permanently fixed thereto. As shown in said FIGURES 2 and 5, such a loading device comprises a low slung hopper indicated generally at 20, which is adapted to rest at ground level to one side of the vertical lift conveyor and is of a size and shape and also sufficiently low in height that it may be conveniently top loaded as from a rear dump wagon or truck backed up thereto. For this purpose a preferred embodiment of such a hopper is illustrated in FIGURES 2 and 5–7, which comprises a pair of upstanding end walls 22 and 24 preferably of a height less than conventional wagon or truck axle height and having flanged lower end portions 26 and 28 which provide wide area contact with the ground on which the hopper 20 is normally rested in its working or operative position. Preferably, also, the upper edges of said end walls 22 and 24 are flanged to provide structure to which other elements may be connected and/or assembled with the hopper as afterwards described. Between said end walls 22, 24 and welded or otherwise secured thereto are a pair of downwardly sloping converging side walls which as illustrated by FIGURE 7 comprise a single sheet of metal folded to an essentially V-shaped channel extending between the two end walls 22 and 24. Said side walls 30 and the V-shaped channel defined thereby are substantially greater in length than end walls 22, 24 and approximately as long as the load bodies of conventional dump wagons and/or trucks are wide. In any event their length should exceed the contemplated width of the material flow which is dumped or poured into the hopper 20. Sidewalls 30 should also be sufficiently spaced at their upper reaches as to provide an adequate target for the load being dumped into the hopper from the wagon. At 32 is an intake or feed auger section extending longitudinally of said downwardly sloped and inwardly converging side walls 30. As shown, auger section 32 is disposed substantially adjacent the bottom of the channel defined by sidewalls 30 and has one end rotatably supported by suitable bearing 34 in end wall 24. Intake auger section 32 is provided with suitable flightings spirally arranged about its shaft so as to convey material loaded into the hopper in the direction of its end wall 22, as when suitably rotated by means hereinafter particularly identified. As shown best in FIGURE 7, the bottom wall of said channel defined by side walls 30, is also rounded to define an arc whose center approximates the axis about which intake auger section 32 rotates. This promotes substantially complete removal of the material dumped into the hopper 20 with rotation of the intake auger. The opposite end of the intake auger is not mounted to the hopper wall but rather is joined by a pivotal connection 36 to the lower end of an inclined delivery auger section 38 suitably enclosed within a conveyor tube 40. Pivotal connection 36 is best shown in FIGURE 6 as intersecting the vertical axis about which auger section 32 turns so as to comprise a universal connection. Auger section 38 is otherwise unsecured and has a length corresponding to that of conveyor tube 40 so that as shown in FIG. 3 it terminates substantially at entrance 42 or opening formed in the conical loading member 14 of the vertical lift conveyor into which the upper end of said tube slightly protrudes in the ground engaging location of the hopper 20. Material is thus fed from the hopper and deposited by the tube 40 substantially at the lowest intake flight 17 of the vertical screw auger 12. For maximum conveyance of material through tube 40 the inside diameter of conveyor tube 40 is only slightly larger than the outside diameter of the auger section 38. As shown best in FIGURE 6, the lower end of the conveyor tube 40 extends through a provided opening 44 in end wall 22 of the hopper and is outwardly flared for communicating with a relatively short transition piece of tubing 46 which receives the otherwise free end of the intake auger section 32. The intake auger section 32 has an outside diameter approximating the outside diameter of the delivery auger 38 and the inside diameter of the transition tubing section 46 is only slightly greater than the outside diameter of the intake auger section 32. Said transition section serves both as a bearing to reduce or minimize play at said end of the intake auger section, and coupled with the inclined conveyor tube 40 it also surrounds universal connection 36 so as to confine the feed of material being directed by the intake or feed auger section 32 past the universal joint 36 into the tube 40 for loading the delivery auger section 38 to its maximum capacity.

For maximum utility of hopper 20, its bottom wall and thereby auger section 32 are located as close to the ground as is practical, and conveyor tube 40 is inclined at approximately 20 degrees to the horizontal disposition of the auger section 32. This permits the conveyor tube 40 to be located a substantial distance from the vertical lift conveyor which facilitates maneuvering of the dump wagon or trucks being backed up to the hopper 20. At the same time it permits the entrance 42 with which the conveyor tube 40 communicates to be located substantially at the base of the conical loading member 14 and the lowermost flighting of the vertical auger 12 for maximum loading of the vertical auger. By so locating entrance 42 at the base of conical member 14, entrance 42 may also serve as a clean out and to discharge foreign materials such as ice and snow which tends to otherwise accumulate in the conical loading member 14 during the winter months, or to gravitate downwardly along the flightings of the vertical screw auger 12. Also, if all the material fed to the conveyor 10 has not been elevated by the auger screw 12 to the top at the termination of a loading operation, entrance 42 provides convenient access for cleaning and/or removal of the material which therefor remains and will tend to gravitate down the flightings of the auger 12.

In order to properly locate the inclined conveyor tube 40 to the hopper and give rigdity to the total construction, reinforcing braces are provided at 48 and 50. These braces have one end suitably welded to opposed sides of the inclined conveyor tube 40 at an appropriate distance forwardly of upstanding end wall 22 of the hopper from whence they diverge and extend along the two upper edges of the hopper side walls 30, their opposite ends being appropriately secured as by welding to upstanding end wall 24. Said upper edges of the hopper sidewalls 30 may be folded to the channel shape illustrated in FIGURE 7 so as to partially encircle said braces 48 and 50 and also welded thereto.

As mentioned, transition tubular section 46 which receives the unsecured end of the feed auger section 32 is relatively short and preferably has a length equal to twice the pitch between two flights of the auger. In any event the major length of the feed auger section 32 is exposed for loading from the inclined walls 30 which slope downwardly toward said auger section on opposed sides thereof. To compensate for the portion of the auger section 32 enclosed by the transition section 46 and which is therefore not exposed to the load, an inclined cover 52 is located between the side walls 30 and over said section. This cover as shown in FIGURE 6 slopes downwardly from adjacent the top edge of end wall 22 to the inner end of the transition section 46 to prevent collection of material about the transition section and instead direct the material to the exposed flightings of the auger section 32. Usefully, auger section 32 will be enclosed by an open type mesh screen 54, the cross members of which are sufficiently small in diameter and the openings therebetween are sufficiently large to permit the passage of material to the auger section 32 but prevent passage into the conveyor tube 40, which might jam or otherwise injure the auger. Screen 54 also serves as a safety device which prevents possible injury to a user of the hopper during operation of the auger 32. Screen 54 is removably mounted to the hopper side walls 30 as by catch members 56, as shown best in FIGURE 9. Said catch members 56 have a hook shaped end and a threaded end, the latter extending through a provided opening in the sidewall 30 and threadedly connected to a nut 58, the hook end of said catch members being caught over a horizontal cross member of the mesh screen 54 so that with tightening of nut 58 the screen may be tightly drawn against sidewall 30. Mounting of the screen 54 on walls 30 is therefore secure; at the same time it is easily removable from the hopper by simply loosening nut 58, catches 56 however ordinarily not having to be completely separated from the sidewalls 30, but only loosened sufficiently to permit disassembly of their hooked end with the screen.

Figure 10:
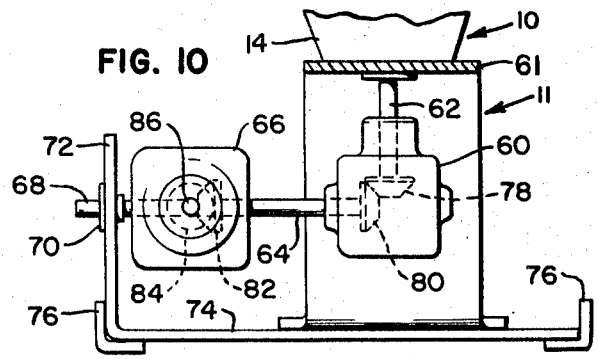
FIGURE 10 is a vertical sectional view taken through the pivotally mounted gear box and illustrates details thereof.

Referring now to FIGURE 10 in conjunction with FIGURES 1 and 5, means indicated generally at 13 are provided by which axial rotation of auger feed section 32 and delivery auger section 38 universally connected thereto at 36 may be obtained simultaneously and by the same prime mover which is relied upon to rotate the auger screw 12 of the vertical lift conveyor. As shown best in FIGURE 10, base 11 which supports the vertical lift conveyor 10 comprises an essential box shaped member 61 having two opposed open sides to one wall of which is bolted a first gear box 60. Gear box 60 includes a vertically disposed outward shaft 62 and a horizontally disposed power take off shaft 64. Output shaft 62 is directly connected to the shaft of the vertical lift auger 12 and is rotated with rotation of shaft 64 by reason of meshing bevel gears 78 and 80. In said copending Neebel and Doerfer application shaft 64 is described as connected to the tumbling rod of a tractor electric motor or other prime mover. However, in accordance with the present invention, said output shaft 64 is connected to a second gear box 66 so as to turn with rotation of its power take off shaft 68. As shown in FIGURE 10, horizontal shafts 64 and 68 are arranged in coaxial alignment, shaft 64 extending between the two gear boxes and shaft 68 rotatably mounted in a provided opening or bearing 70 in an upstanding support 72 through which it extends for connection to the tumbling rod of a tractor or other prime mover. As illustrated in said FIGURE 10, at 74 is a platform to which box-shaped base 61 which supports the vertical lift conveyor 10 and upright support 72 are suitably fastened. Platform 74 preferably also has a pair of channel sections 76 which extend along two opposed sides thereof and protrude forwardly thereof toward the hopper 20. Platform 74 and protruding sections 76 not only unite upright support 72 and base 12 into an integral structure, but also provide a mounting or base support for the total structure of improved stability, for example during pivoting of hopper 20 as afterwards described.

Within the second gear box 66 and affixed to shaft 68 midway of its ends to rotate therewith is a third bevel gear 82 which meshes with a fourth bevel gear 84 affixed to one end of a rod 86. Rod 86 is of a squared or other cross section so as to non-rotatably telescope within a correspondingly shaped bore in the end of rod 90. Rods 86 and 90 together comprise a drive shaft which is in turn pivotally connected to a second drive member 96 as by pivot member 92. As shown best in FIGURES 2 and 8, member 96 is rotatably mounted in end walls 22 and 24 of the hopper so as to turn on its longitudinal axis which substantially parallels the axis of the auger section 32. Pivot 92 extends through the axis of rotation of drive member 96 substantially at right angles thereto thus affording a universal connection between drive member 96 and the telescoping drive shaft 86, 90. Drive member 96 as shown in FIGURE 2 is located below sidewall 30 and to one side of auger section 32. The invention contemplates that drive member 96 also may be relocated or a second drive member provided on the opposite side of auger section 32 and which may be operated when it is found preferable to locate gear box 66 and its supporting structure including power take off shaft 68 to the opposite side of hopper 14 of the vertical conveyor as illustrated.

Also, as shown by FIGURES 5 and 8, its aforedescribed universal connection with rod 90 of the telescoping drive link 86, 90 is shieldingly supported within a channel member 98 secured to the outside of the hopper end wall 22, the bight portion of said channel member 98 having an opening elongated in its vertical direction to permit limited pivotal movement of the drive link 86, 90. Rod 96 is rotatably supported by suitable bearings in end walls 22, 24, and affixed to its opposite end is a sprocket 100 having chain driving engagement with a sprocket 102 secured to the end of auger section 32 so that rotation of shaft 96 effectively rotates auger section 32 and delivery auger section 38 to which it is also connected as by universal joint 36. Preferably, sprockets 100, 102 and chain 101 are enclosed by suitable cover 104. As thus described, it will be understood that with rotation of shaft 68 (FIG. 10) by the prime mover meshing beveled gears 82 and 84 will effectively rotate telescoping drive shaft 86, 90 and turn rod 96 universally connected thereto to rotate auger sections 32 and 38 at the base of the hopper and within conveyor tube 40, respectively. Simultaneously the prime mover will also rotate the vertical auger by reason of the meshing of bevel gears 80 and 78.

Figure 4:
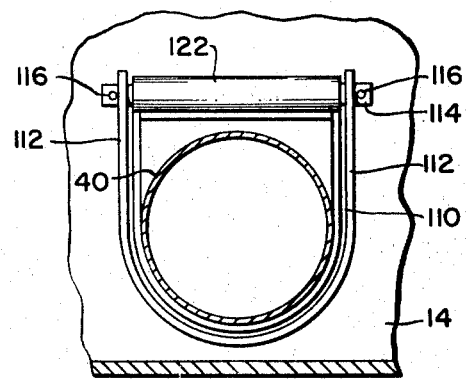
FIGURE 4 is a sectional view taken along lines 4—4 of FIGURE 3 looking in the direction indicated by the arrow and shows further details of said mounting.

In accordance with the invention, the upper end of the inclined conveyor tube 40 of the loading hopper is removably connected to the conical loading member 14 of the vertical lift conveyor immediately above entrance 42 and in such a manner as will permit the hopper 20 to be operatively pivoted from its horizontal position at which it is normally operated (FIG. 2) to a more nearly vertical storage position alongside the vertical lift conveyor 10 and above the entrance 42 as illustrated by FIGURE 1. It is also desirable to be able to incline the loading hopper at a slightly different angle as where the ground is sloped toward or away from the vertical lift conveyor. Again at the end of a loading operation it is desirable to be able to speed removal of the last portion in the hopper by raising the hopper to concentrate the remaining load on the flightings of the hopper auger section 32. Referring therefore particularly to FIGURES 3 and 4, conical loading member 14 is shown provided with a generally U-shaped collar 110 having a pair of upstanding legs 112 (FIGURE 4) which project outwardly from the wall of said conical loading member on two sides and the base of entrance 42. These legs 112 are provided with aligned openings through which a pintle member 114 extends. Secured to the upper end of conveyor tube 40 as by an encircling collar 120, appropriately welded thereto is a transversely extending cylinder 122 which is located between the upper reaches of said legs 112 and in alignment with said openings therein to removably receive pintle 114 when passed therethrough. Transverse openings 116 are provided in the opposed ends of the pintle member through which hasps may be removably inserted to releasably secure the pintle in place and thereby tube 40 to the conveyor housing. By such means conveyor tube 40 is not only secured to the conical loading member 14 so that its upper end may be properly aligned with entrance 42. At the same time it is adapted for pivotal movement about an axis immediately above said entrance. As previously described, shafts 64 and 68 of the drive means 13 are coaxially related so that they also support the second gear box 66 for rotation about a horizontal axis which as shown in FIGURE 2, parallels the horizontal axis defined by pintle 114, and cooperating cylinder 122 about which the hopper 20 is pivotally connected to the vertical lift conveyor. Since the telescoping one of the two drive links through which rotation of shaft 68 effects rotation of the hopper is variable in length and is also connected to the second drive link 96 by a universal connection, hopper 20 may be bodily raised so as to swing about its pivotal connection represented by pintle 114 and sleeve 122 and without interrupting the drive connection of means 13 to either the vertical screw auger 12 of the vertical lift conveyor or the auger sections 32 and 38 of the hopper wherefor both will continue to turn during elevation of the hopper. Although not essential, preferably the telescoping rods 86, 90 comprising the first mentioned and telescoping drive link are enclosed by a protective piece of tubing 94 which freely floats over the junction between the telescoping rods 86, 90 to prevent the operator's clothing from accidentally wrapping on the rotating shaft should he brush thereagainst, as when raising or lowering the hopper 20. It will also be appreciated that U-shaped collar 110 and its upstanding legs 112 have sufficient width to not only provide an effective seal against material leakage at the juncture of conveyor housing 40 with the conical shape loader 14 when the hopper 20 is located at its normal working position as illustrated in FIGURE 2, but also when it is disposed at other heights. For example, it is desirable that the width of said collar 110 be sufficient to effect a material seal when the hopper is raised about the pivotal connection represented by pintle 114 to waist or even shoulder height of the operator.

In order to assist in swinging and/or elevating the hopper 20 about its pivotal connection at 114, counter balancing means are provided. This means is best shown in FIGURE 1 when considered in conjunction with FIGURE 2. Referring therefore to said figures, such counter balancing means comprises a flexible cable 122 which is connected as by tying or back splicing one end thereof to an eye connector 124 attached to the mentioned upper flange of end wall 22, preferably centrally thereof. The other end of cable 122 dead ends on a lower pulley clamp 126 as shown in FIGURE 1 which is securely fastened as by clamp 128 to the vertical lift conveyor housing 15. As shown in FIGURE 1, cable 122 first passes along the inside of a pulley wheel 130 mounted on said mentioned bracket 126 then upwardly about an upper pulley 132 and down to its attachment to said first mentioned pulley bracket 126. As shown in said FIGURE 1, said upper pulley 132 is carried by a bracket 134 attached to one end of a counter balancing extension spring 136 having its upper end secured to a bracket 138 secured to the vertical lift conveyor housing 15 by a second clamp 140. Although the same will vary in accordance with particular dimensions and ratios employed, we have found that by employing a spring at 136 having a tensile strength of 13 pounds to the inch and which is initially elongated approximaetly six inches beyond its at rest length when the hopper is at its normally disposed horizontal position as illustrated in FIGURE 2, it will so balance the weight of an 85 pound hopper as to require approximately 25 pounds of manual exertion on the part of the operator to lift the hopper. The above is, however, exemplatory only and the extent of counterbalancing may be adjusted to suit particular requirements.

As the invention has thus been described, it will be appreciated that the construction represents one by which all of the recited objects, features and advantages are readily obtained and in a highly economical and practical structure both from the viewpoint of manufacture and from the point of use to which the invention may be put by the average farmer or other operator having need of such a device.

Although the invention has been described with respect to a preferred embodiment thereof, it is to be understood that the invention is not limited thereto, since various modifications of said invention will at once suggest themselves from the aforesaid description and are intended to be encompassed within its true spirit and scope as indicated by the appended claims.

Having described our invention, we claim:

1. The combination of a vertical conveyor embodying a vertical extending auger and an enclosure therefor having an entrance adjacent the base of the vertical auger, a top-loading hopper adapted to rest on the ground in its normal working position and having a feed auger extending longitudinally of the hopper generally parallel to the bottom thereof, said feed auger being rotatably mounted at one end to said hopper and a short transition tube receiving the other end of said feed auger and secured to the other end of said hopper, a conveyor tube having its lower end fixed to said other end of the hopper and inclined with respect to said feed auger, the lower end of said conveyor tube communicating with said transition tube for receiving material fed into the transition tube from the other end of said feed auger, and an inclined delivery auger contained within said conveyor tube, said delivery auger extending longitudinally of the conveyor tube and having its lower end connected to the feed auger to turn axially therewith, horizontal pivot means pivotally connecting the upper end of the conveyor tube to the enclosure of the vertical conveyor above its said entrance, upper end of the conveyor tube and delivery auger being located thereby in feeding relation to the entrance of the vertical conveyor auger when the hopper is in its normal working position, drive means including a horizontally disposed axially rotatable shaft adapted to be rotated by a prime mover and having motion transmitting means thereon and associated with said vertical auger and feed auger for simultaneously rotating said vertical auger and feed auger about their respective longitudinal axes in response to rotation of said shaft, said motion transmitting means permitting the hopper to be tilted on said horizontal pivot means and relative to said horizontally disposed shaft so as to be raisable to different heights from its normal working position on the ground as the feed auger is rotated thereby.

2. A loading device as claimed in claim 1 further including counter balancing means for facilitating tilting of the hopper about its pivotal connection to the vertical conveyor.

3. A loading device as claimed in claim 2 wherein the counter balance means comprises a spring having a one end mounted above the hopper; a pulley mounted from another end of the spring; a cable dead-ended at one end thereof and attached to the hopper at another end; and an intermediate portion of said cable is supported by the pulley to counter balance the weight of the hopper when positioning the hopper.

4. A loading device as claimed in claim 1 further including a removably mounted protective wide mesh screen over the auger in said hopper.

5. A loading device as claimed in claim 1 further including means for releasably mounting the upper end of the inclined tubular section to the vertical conveyor enclosure; said mounting means effectively sealing the inclined tubular section with the vertical conveyor housing to minimize material leakage when the hopper is in its horizontal working position and permitting exposure of said entrance when the hopper is in its vertical storage position.

6. A loading device as claimed in claim 1 further having ing means wherein the drive means may be optionally located to either side of the vertical conveyor and corresponding side of the hopper.

7. The combination of a vertical conveyor embodying a vertical extending auger and an enclosure therefor having an entrance adjacent the base of the vertical auger, a top-loading hopper adapted to rest on the ground in its normal working position, a feed auger extending longitudinally of the hopper generally parallel to the bottom thereof, said feed auger being axially rotatably mounted at one end to said hopper, a short transition tube secured to the other end of said hopper and receiving the other end of the feed auger, a delivery auger having one end connected to said other end of the feed auger to rotate axially therewith, a conveyor tube enclosing said delivery auger, said conveyor tube being inclined with respect to said feed auger and fixed at its lower end to said hopper in communication with said transmission tube for receiving material fed into said transmission tube from the other end of said feed auger, the upper end of said conveyor tube communicating with said entrance to the enclosure of the vertical conveyor and pivotally connected to said enclosure above its said entrance so as to be in feeding relation to the base of vertical conveyor auger when the top loading hopper is in its normal working position, and drive means adapted for simultaneously rotating said vertical auger and feed auger about their respective longitudinal axis to effect feeding of material loaded into the hopper to the vertical conveyor, the drive means including a first shaft rotatably supported below the base of the vertical auger to turn on a horizontal axis spaced below and generally parallel to said pivotal connection of the hopper to the vertical conveyor enclosure, said first shaft having one end adapted for connection to a prime mover for rotation thereby and a first gear means at its other end adapted for rotation to turn the vertical conveyor auger with rotation of said first shaft, a telescoping drive shaft operatively connected at one end to rotate the feed auger of the hopper therewith, and second gear means on the opposite end of said telescoping drive shaft associated with said first shaft intermediate its ends so that the telescoping drive shaft will rotate with rotation of the first shaft to permit tilting of the hopper about its pivotal connection to different angular positions relative to the vertical conveyor.

8. The combination of claim 7 further including counter balance means which facilitate tilting of the hopper from a generally horizontal working position to a more nearly vertical storage position adjacent the vertical conveyor and which exposes said entrance in the vertical conveyor enclosure.

References Cited

UNITED STATES PATENTS

| | | | |
|---|---|---|---|
| 2,066,756 | 1/1937 | Anderson | 198—64 |
| 3,093,271 | 6/1963 | Douglas | 198—64 |
| 3,156,344 | 11/1964 | Batterson et al. | 198—91 |

RICHARD E. AEGERTER, *Primary Examiner.*

UNITED STATES PATENT OFFICE
CERTIFICATE OF CORRECTION

Patent No. 3,391,779　　　　　　　　　　　　　　July 9, 1968

Lawrence Eugene Scheel et al.

It is certified that error appears in the above identified patent and that said Letters Patent are hereby corrected as shown below:

Column 10, between lines 72 and 73, insert

| | | | |
|---|---|---|---|
| 2,517,456 | 8/1950 | Wherrett | 214-83.32 |
| 2,662,634 | 12/1953 | Tintes | 198-123 |

Signed and sealed this 9th day of December 1969.

(SEAL)
Attest:

Edward M. Fletcher, Jr.　　　　　　　　　WILLIAM E. SCHUYLER, JR.
Attesting Officer　　　　　　　　　　　　Commissioner of Patents